Patented Aug. 14, 1928.

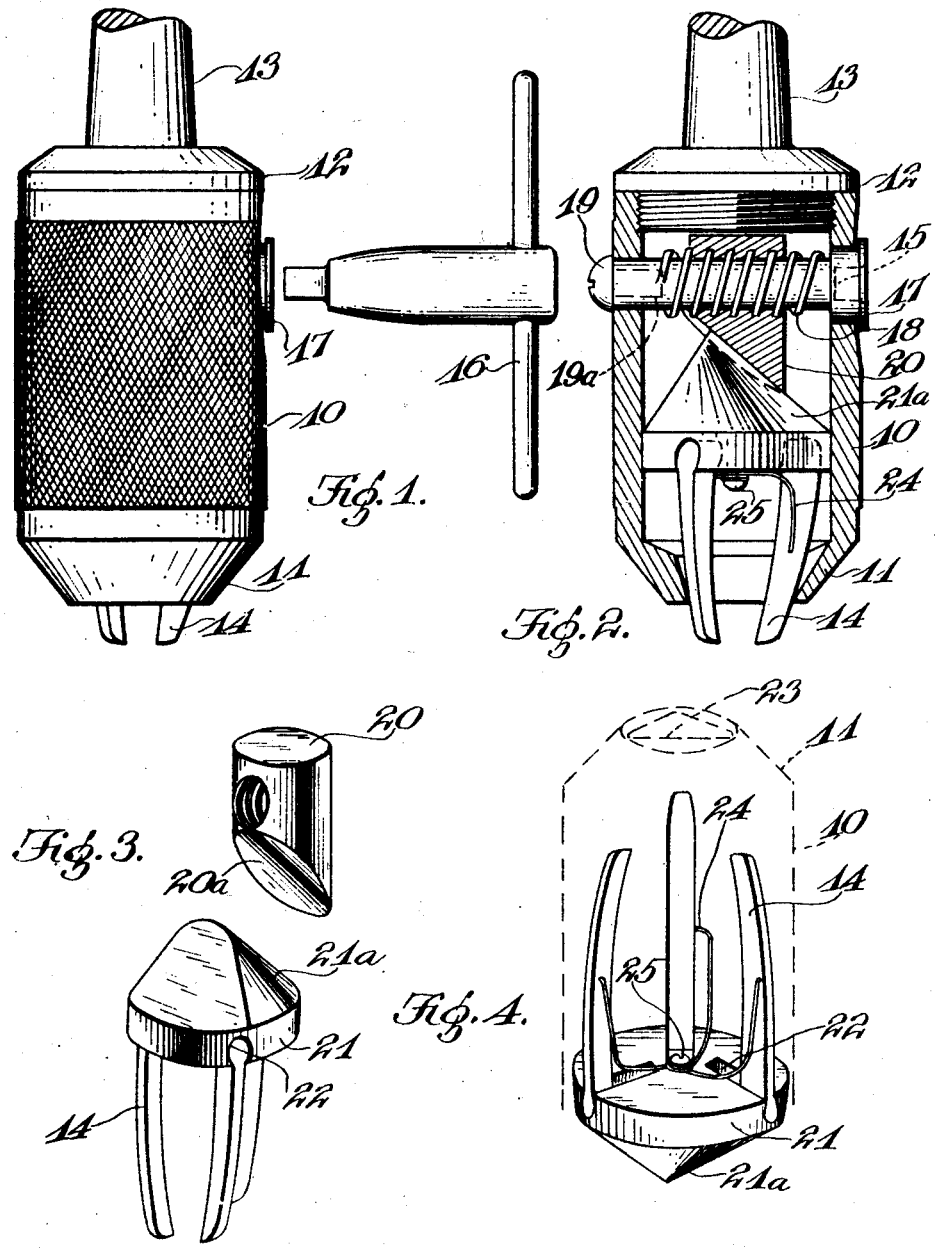

1,680,631

UNITED STATES PATENT OFFICE.

GEORGE J. PALAITH, OF CHICAGO, ILLINOIS.

DRILL CHUCK.

Application filed October 9, 1926. Serial No. 140,645.

This invention relates to chucks for drills, reamers and like tools, and its object is to provide a chuck which exerts a strong and permanent hold upon the drill or other tool held therein.

A further object of the invention is to provide a device of this kind which requires but little effort on the part of the operator to secure the drill or other tool therein.

A still further object of the invention is to embody in the novel appliance a feed which is rugged and easily bears the strain incident to its hold on the tool.

A final but nevertheless important object of the invention is to construct the novel chuck of few and simple parts, whereby it may be cheaply produced.

With the above objects in view, and any others which may suggest themselves from the specification and claims to follow, a better understanding of the invention may be gained by reference to the accompanying drawings, in which—

Figure 1 is an elevation of the novel appliance, showing the application of a key-wrench thereto;

Fig. 2 is a vertical section, showing the interior of the appliance;

Fig. 3 is a perspective view showing two important elements in the feed; and

Fig. 4 is a perspective view of the tool holding element in inverted position.

Referring specifically to the drawing, 10 denotes the housing or body of the novel chuck, the same being of heavy tubular stock and tapering at its lower end—as shown at 11—on customary lines. The housing is screwed on the usual head-piece 12 which carries the tapered stem 13 insertible into the stock of the drill press, lathe or other machine for which the appliance is intended; or, the housing may be suitably mounted when desired to be applied to a hand drill or brace.

The chuck has a set of jaws 14 at the bottom these being of conventional design where they apply to the drill or other tool to be held. The feed for the jaws originates with a socket 15 in the side of the housing into which the tip of a standard key-wrench 16 is insertible and the latter turned in one or the other direction to apply or release the grip of the jaws upon the tool.

The socket 15 is located in the head 17 of a screw 18, which is loosely mounted across the upper portion of the housing, receiving in a tapped hole $19^a$ a screw 19 in its remote end to prevent its dislodgment. On the screw 18 is mounted a traveling nut 20.

The traveling nut 20 is adapted to move laterally between the housing walls as the key-wrench 16 is manipulated, and its bottom surface is cut on a bias, as indicated at $20^a$ and also conically concaved, to conform to the conoidal side $21^a$ of a block 21 located in the lower portion of the housing. The base of the block is round and adapted to slide in contact with the end of head piece 12 whereby it is prevented from rotating. Said base is recessed with undercut sockets 22 to receive the similarly-shaped inner ends of the tool jaws 14, these being loosely retained to enable them to easily open or close.

The jaws 14 are three in number, and the issue opening of the chuck is therefore made triangular, as indicated at 23 in Figure 4, to aline the jaws, distribute them equally, and keep them from turning.

It will now be seen that when the screw 19 is operated to move the traveling nut 20 toward the left (Fig. 2), the block 21 will be forced downwardly, and the jaws will advance, closing at the same time, as in standard chucks of this type. When the traveling nut is, however, caused to move in the opposite direction, the block will be free to recede and permit the jaws to spread. The spreading of the latter is induced by the outward pressure of a set of wire springs 24 jointly secured at their source to the block by a screw 25.

It will be apparent that since the action of engaging the tool is positive in the novel chuck, the hold exerted will be firm and permanent. The screw acts in the nature of a worm, which requires but little manual effort to cause a vise-like grip to be exerted by the jaws, on account of the advantageous leverage present. At the same time, the thread of the screw is designed for rapid travel of the nut, so that time is not lost when making adjustments. The heavy construction of the screw and nut permits these parts to withstand the strain to which they are subjected while exerting pressure upon the inner ends of the jaws, while the latter are given support and guidance in the reduced end of the housing. No delicate parts enter into the engaging action of the chuck, and the parts employed are few and simple, making it possible to produce the appliance at low cost.

It will be noted that the sockets 22 for the jaws 14 are radially arranged, permitting the jaws to slide on their heels when to close or open. This arrangement is very simple, and the jaws are movably retained without links, springs or other attachments usually employed to "float" them in the housing.

While the preferred form of the invention has been illustrated and described, it will be obvious that many minor changes or refinements may be made in the structure or design without departing from the spirit and scope of the invention, and I desire my rights to extend to such changes or refinements.

I claim:—

1. A drill chuck comprising a housing having a reduced issue end, a block axially slidable within said housing, a group of jaws carried by said block at their inner ends and adapted to be contracted by the issue end of the housing when advanced thereinto, outwardly acting springs carried by the block at its outer face and engaging the jaws to separate the same, a single securing element for said springs, a manually-operable worm transversely journalled in the opposite end of the housing, a cam threaded upon said worm and adapted to be propelled thereby, and the cam bearing against the block and being adapted to advance the same toward the reduced issue end of the housing, the cam being positioned to engage a portion of said housing to prevent its rotating.

2. A drill chuck comprising a housing having a reduced issue end, a group of jaws longitudinally movable in said housing and adapted to be contracted when advanced to engage the reduced issue end of the housing, a manually-operable and transversely disposed worm journalled in the opposite end of the housing, a cam threaded on said worm and adapted to be propelled thereby, said housing having means to prevent said cam from turning, and a block adapted to be moved by the cam to engage and actuate the jaws longitudinally into the issue end of said housing.

3. A drill chuck comprising a housing having a reduced issue end, a group of jaws longitudinally movable in said housing toward the reduced issue end thereof and adapted to be contracted thereby when advanced thereinto, a manually-operable and transversely disposed worm journalled in the opposite end of the housing, a cam threaded on said worm and adapted to be propelled thereby, said housing having means to prevent said cam from turning, a block adapted to be moved by the cam to engage and actuate said jaws toward the reduced housing end, said worm having a flange at one end bearing against the outer wall of said housing and a tapped recess in its other end, and a screw positionable in said tapped recess and having its head engaging the adjacent wall of said housing for holding the worm rotatably in place.

4. A drill chuck comprising a housing having a reduced issue end, a block axially slidable within said housing, a group of jaws carried by said block at their inner ends and adapted to be contracted by engagement with the issue end of the housing, outwardly acting springs carried by the block at its outer face and engaging the jaws to separate the same, a single securing element for said springs, a manually-operable worm transversely journalled in the opposite end of the housing, a cam threaded upon said worm and adapted to be propelled thereby, the cam bearing against the block and being adapted to actuate same and the jaws toward the reduced issue end of the housing, the cam being positioned to engage a portion of said housing to prevent its rotating, said worm having a flange at one end bearing against the outer wall of said housing and a tapped recess in its other end, and a screw positionable in said tapped recess and having its head engaging the adjacent wall of said housing for holding the worm rotatably in place.

5. A drill chuck comprising a housing having a reduced issue end, a group of jaws longitudinally movable in said housing and adapted to be contracted by engagement with the reduced issue end of said housing when advanced thereinto, a manually-operable and transversely disposed worm journalled in the opposite end of the housing, a cam threaded on said worm and adapted to be propelled thereby, and an arbor carrying head piece threaded into the rear end of said housing and having its inner face engaging said cam to prevent rotation thereof, and a block adapted to be moved by the cam to engage and actuate said jaws in the advancing direction toward the issue end of said housing.

6. A drill chuck comprising a housing having a reduced issue end, a block axially slidable within said housing, a group of jaws carried by said block at their inner ends and adapted to be contracted by engagement with the reduced issue end of the housing when forced thereinto, outwardly acting springs carried by the block at its outer face and engaging the jaws to separate the same, a single securing element for said springs, a manually-operable worm transversely journalled in the opposite end of the housing, a cam threaded upon said worm and adapted to be propelled thereby, the cam bearing against the block and being adapted to actuate the same to force the jaws into the reduced issue end of said housing, said worm having a flange at one end bearing against the outer wall of said housing and a tapped recess in its other end, a screw positionable in said tapped recess and having its head engaging the adjacent wall of said housing for holding the worm rotatably in place, and an arbor carrying head piece threaded into the rear end of said housing and having its inner face engaging said cam to prevent rotation thereof.

In testimony whereof I affix my signature.

GEORGE J. PALAITH.